US007713125B2

(12) United States Patent
Asher et al.

(10) Patent No.: US 7,713,125 B2
(45) Date of Patent: May 11, 2010

(54) JACKPOT RACE EVENT

(75) Inventors: Joseph M. Asher, New York, NY (US); Kenneth L. Miller, Ankeny, IA (US); Peter Christopher Rotondo, New York, NY (US)

(73) Assignee: Cantor Index, LLC, New York, NY (US)

( * ) Notice: Subject to any disclaimer, the term of this patent is extended or adjusted under 35 U.S.C. 154(b) by 277 days.

(21) Appl. No.: 11/190,613

(22) Filed: Jul. 26, 2005

(65) Prior Publication Data

US 2007/0026939 A1 Feb. 1, 2007

(51) Int. Cl.
*G06F 19/00* (2006.01)

(52) U.S. Cl. .......................................................... 463/28

(58) Field of Classification Search ............. 463/25–29, 463/42

See application file for complete search history.

(56) References Cited

U.S. PATENT DOCUMENTS

| | | | | |
|---|---|---|---|---|
| 3,909,002 | A | 9/1975 | Levy | |
| 4,874,177 | A | 10/1989 | Girardin | |
| 4,962,950 | A | 10/1990 | Champion | |
| 5,275,400 | A | 1/1994 | Weingardt et al. | |
| 5,374,060 | A | 12/1994 | Goldberg | |
| 5,452,899 | A | 9/1995 | Skratulia et al. | |
| 5,573,244 | A | 11/1996 | Mindes | |
| 5,586,937 | A | 12/1996 | Menashe | |
| 5,687,968 | A | 11/1997 | Tarantino | |
| 5,713,793 | A | 2/1998 | Holte | |
| 5,743,525 | A | 4/1998 | Haddad | |
| 5,749,785 | A | 5/1998 | Rossides | |
| RE35,864 | E | 7/1998 | Weingardt | 463/28 |

(Continued)

FOREIGN PATENT DOCUMENTS

EP 0 217 984 A1 4/1987

(Continued)

OTHER PUBLICATIONS

*Notification of Transmittal of the International Search Report and the Written Opinion of the International Searching Authority, or the Declaration* for International Application No. PCT/US06/28140; 8 pages, Feb. 20, 2007.

(Continued)

*Primary Examiner*—Ronald Laneau
*Assistant Examiner*—Tramar Harper
(74) *Attorney, Agent, or Firm*—David E. Boundy

(57) ABSTRACT

A system for wagering on a jackpot race event, comprises a memory and a processor. The memory stores a qualifying bet associated with a customer and comprising a first bet component and a second bet component. The first bet component is associated with a first qualifying race event and comprises a first bet amount. The second bet component is associated with a second qualifying race event and comprises a second bet amount. The processor identifies the outcome of the first and second bet components. If both the first bet component and the second bet components are winning bets, the processor allocates to the customer a particular number of jackpot bets for a jackpot race event. The particular number of jackpot bets is based at least in part upon the first bet amount and the second bet amount. The first bet amount is allocated to a common pari-mutuel pool for the first qualifying race event.

42 Claims, 4 Drawing Sheets

U.S. PATENT DOCUMENTS

| | | | | |
|---|---|---|---|---|
| 5,830,068 | A | 11/1998 | Brenner et al. | |
| 5,839,726 | A | 11/1998 | Luise | 273/246 |
| 5,842,921 | A | 12/1998 | Mindes et al. | |
| 5,888,136 | A | 3/1999 | Herbert | |
| 5,957,775 | A | 9/1999 | Cherry | |
| 5,984,779 | A | 11/1999 | Bridgeman | |
| 6,004,211 | A | 12/1999 | Brenner | |
| 6,113,492 | A | 9/2000 | Walker | |
| 6,126,543 | A | 10/2000 | Freedman | |
| 6,152,822 | A | 11/2000 | Herbert | |
| 6,210,275 | B1 | 4/2001 | Olsen | 463/16 |
| 6,287,199 | B1 | 9/2001 | McKeown | |
| 6,296,569 | B1 | 10/2001 | Congello | |
| 6,309,307 | B1 | 10/2001 | Krause | |
| 6,325,721 | B1 | 12/2001 | Myamoto | |
| 6,331,148 | B1 | 12/2001 | Krause | |
| 6,354,592 | B1 | 3/2002 | Virzi | 273/138.1 |
| 6,358,150 | B1 | 3/2002 | Mir et al. | |
| 6,383,074 | B1 | 5/2002 | Boggs | |
| 6,450,887 | B1 | 9/2002 | Mir et al. | |
| 6,527,270 | B2 | 3/2003 | Maksymec | |
| 6,554,708 | B1 | 4/2003 | Brenner et al. | |
| 6,688,978 | B1 | 2/2004 | Herman | |
| 6,695,701 | B2 | 2/2004 | Aronson | |
| 6,712,701 | B1 | 3/2004 | Boylan, III et al. | |
| 6,722,980 | B2 | 4/2004 | Stronach | |
| 6,786,824 | B2 | 9/2004 | Cannon | 463/42 |
| 6,811,483 | B1 | 11/2004 | Webb et al. | |
| 6,837,789 | B2 | 1/2005 | Garahi et al. | |
| 6,837,791 | B1 | 1/2005 | McNutt | |
| 6,926,607 | B2 | 8/2005 | Slomiany et al. | 463/20 |
| 6,929,550 | B2 | 8/2005 | Hisad | |
| 7,147,557 | B1 | 12/2006 | Tracy et al. | 463/16 |
| 7,201,658 | B2 | 4/2007 | Marshall | |
| 7,311,606 | B2 | 12/2007 | Amaitis | |
| 7,351,149 | B1 | 4/2008 | Simon et al. | |
| 2001/0031656 | A1 | 10/2001 | Marshall et al. | 463/6 |
| 2001/0039209 | A1 | 11/2001 | DeWeese | |
| 2001/0041612 | A1 | 11/2001 | Garahi et al. | |
| 2001/0047291 | A1 | 11/2001 | Garahi et al. | |
| 2001/0051540 | A1 | 12/2001 | Hindman | |
| 2002/0049975 | A1 | 4/2002 | Thomas | |
| 2002/0094853 | A1 | 7/2002 | Hayashi | |
| 2002/0115488 | A1 | 8/2002 | Berry | |
| 2002/0149152 | A1 | 10/2002 | Taylor | |
| 2002/0177483 | A1 | 11/2002 | Cannon | 463/42 |
| 2003/0054870 | A1 | 3/2003 | Sato | |
| 2003/0096646 | A1 | 5/2003 | Nzhu | |
| 2003/0119582 | A1 | 6/2003 | Ocampu | |
| 2003/0125822 | A1 | 7/2003 | LaNeve | |
| 2003/0212623 | A1 | 11/2003 | Aylmer et al. | |
| 2004/0004656 | A1 | 1/2004 | Sambongi | |
| 2004/0006484 | A1 | 1/2004 | Manis | |
| 2004/0039461 | A1 | 2/2004 | Stefani | |
| 2004/0048656 | A1 | 3/2004 | Krynicky | |
| 2004/0063484 | A1 | 4/2004 | Dreaper et al. | 463/16 |
| 2004/0104845 | A1 | 6/2004 | McCarthy | |
| 2004/0111358 | A1 | 6/2004 | Lange et al. | 705/37 |
| 2004/0192437 | A1 | 9/2004 | Amaitis et al. | |
| 2004/0193469 | A1 | 9/2004 | Amaitis et al. | |
| 2004/0193531 | A1 | 9/2004 | Amaitis et al. | 705/37 |
| 2004/0198483 | A1 | 10/2004 | Amaitis | |
| 2004/0204245 | A1 | 10/2004 | Amaitis et al. | |
| 2004/0229671 | A1 | 11/2004 | Stronach et al. | 463/6 |
| 2004/0235542 | A1 | 11/2004 | Stronach et al. | |
| 2005/0032565 | A1 | 2/2005 | Cheng et al. | 463/16 |
| 2005/0044575 | A1 | 2/2005 | Kuyl et al. | |
| 2005/0049731 | A1 | 3/2005 | Dell | 700/91 |
| 2005/0107153 | A1 | 5/2005 | Jubinville et al. | 463/18 |
| 2005/0116410 | A1 | 6/2005 | Vlazny et al. | |
| 2005/0148379 | A1 | 7/2005 | Huard | |
| 2005/0170886 | A1 | 8/2005 | Miller | |
| 2005/0176495 | A1 | 8/2005 | Stronach | 463/25 |
| 2005/0176496 | A1 | 8/2005 | Stronach | |
| 2005/0176499 | A1 | 8/2005 | Stronach | 463/27 |
| 2005/0181862 | A1 | 8/2005 | Asher et al. | |
| 2005/0181868 | A1 | 8/2005 | Vlazny | |
| 2005/0187000 | A1 | 8/2005 | Miller | |
| 2006/0073870 | A1 | 4/2006 | Cannon | 463/17 |
| 2006/0214376 | A1 | 9/2006 | Weller | 273/292 |
| 2007/0026940 | A1 | 2/2007 | Cannella | 463/28 |
| 2007/0184890 | A1 | 8/2007 | Ollington | 463/17 |

FOREIGN PATENT DOCUMENTS

| | | | |
|---|---|---|---|
| EP | 0 625 760 | A1 | 10/1999 |
| EP | 1 104 686 | A1 | 6/2001 |
| EP | 1 288 820 | A2 | 3/2003 |
| EP | 1 319 428 | A2 | 11/2003 |
| EP | 1 442 773 | A2 | 8/2004 |
| EP | 0 848 846 | B1 | 12/2006 |
| GB | 1 574 447 | | 9/1980 |
| GB | 2 180 675 | | 4/1987 |
| GB | 2 299 425 | | 10/1996 |
| GB | 2 356 353 | | 5/2001 |
| GB | 2 377 055 | | 12/2002 |
| GB | 2 380 687 | | 4/2003 |
| GB | 2 384 097 | | 7/2003 |
| GB | 2 387 009 | | 10/2003 |
| GB | 2 388 928 | | 11/2003 |
| GB | 2 400 202 | | 10/2004 |
| JP | 2002-177630 | | 6/2002 |
| NZ | 516935 | | 1/2002 |
| WO | WO 98/04991 | A1 | 2/1998 |
| WO | WO 99/01192 | A1 | 1/1999 |
| WO | WO 99/30788 | | 6/1999 |
| WO | WO 00/00256 | A1 | 1/2000 |
| WO | WO 00/22908 | A2 | 4/2000 |
| WO | WO 00/67215 | A1 | 11/2000 |
| WO | WO 00/79442 | A1 | 12/2000 |
| WO | WO 01/65507 | A2 | 9/2001 |
| WO | WO 01/65508 | A2 | 9/2001 |
| WO | WO 01/68204 | A2 | 9/2001 |
| WO | WO 01/64305 | A2 | 10/2001 |
| WO | WO 01/73649 | A2 | 10/2001 |
| WO | WO 01/77861 | A2 | 10/2001 |
| WO | WO 01/77964 | A2 | 10/2001 |
| WO | WO 02/101673 | A1 | 12/2002 |
| WO | WO 03/004115 | A2 | 1/2003 |
| WO | WO 03/004115 | A3 | 1/2003 |
| WO | WO 03/022378 | A2 | 3/2003 |
| WO | WO 03/046852 | A2 | 6/2003 |
| WO | WO 2004/003803 | A2 | 1/2004 |
| WO | WO 2005/019986 | A2 | 3/2005 |
| WO | WO 2005/057339 | | 6/2005 |
| WO | WO 2005/074617 | | 8/2005 |
| WO | WO 2005/082478 | | 9/2005 |
| WO | WO 2005/086924 | | 9/2005 |
| WO | WO 2006/017877 | | 2/2006 |

OTHER PUBLICATIONS

California Regulatory Notice Register, Title 4. California Horse Racing Board, Aug. 29, 2003.

Notification of Transmittal of the International Search Report and the Written Option of the International Searching Authority, mailed Jul. 28, 2005, International Application No. PCT/US05/06314 (10 pp.).

Scarne, John, "Scarne's New Complete Guide to Gambling" (excerpt); Simon & Schuster, 1974, pp. 38-42.

Notification of Transmittal of the Internal Search Report and the Written Opinion of the International Searching Authority, mailed Oct. 12, 2005, Application No. PCT/US05/03315 (10 pp.).

Notification of Transmittal of the Internal Search Report and the Written Opinion of the International Searching Authority, mailed Aug. 12, 2005, Application No. PCT/US05/03292 (10 pp.).

Scarne, John, "Scarne's New Complete Guide to Gambling" (excerpt); Simon & Schuster, 1974, pp. 32-55.
USPTO Office Action for U.S. Appl. No. 10/771,221, filed Feb. 3, 2004 in the name of Kenneth L. Miller, Notification Date: Aug. 17, 2007 (10 pp.).
Internet Archive Wayback Machine: "TAB New Zealand's Betting Agency", http://web.archive.org/web/19980623064154/http//www.tab.co.nz/; Jun. 23, 1998 (15 pp.).
Intellectual Property Office of New Zealand Examination Report for Patent Application No. 549700, May 23, 2007 (3 pp.).
Intellectual Property Office of New Zealand Examination Report for Patent Application No. 549121, May 17, 2007 (2 pp.).
USPTO Office Action for U.S. Appl. No. 10/784,353, Jul. 11, 2007 (15 pgs).
Supplementary European Search Report mailed Nov. 19, 2007, Application No. EP05712675 (3 pgs).
USPTO Office Action for U.S. Appl. No. 10/771,221, Sep. 9, 2005 (9 pgs).
USPTO Office Action for U.S. Appl. No. 10/771,221, Mar. 8, 2006 (12 pgs).
USPTO Office Action for U.S. Appl. No. 10/771,221, Dec. 27, 2006 (6 pgs).
USPTO Office Action for U.S. Appl. No. 10/771,221, Aug. 17, 2007 (7 pgs).
USPTO Office Action for U.S. Appl. No. 10/771,221, Nov. 1, 2007 (3 pgs).
USPTO Office Action for U.S. Appl. No. 10/771,221, Jan. 28, 2008 (8 pgs).
USPTO Office Action for U.S. Appl. No. 10/771,076, Jul. 14, 2005 (9 pgs).
USPTO Office Action for U.S. Appl. No. 10/771,076, Feb. 14, 2007 (11 pgs).
USPTO Office Action for U.S. Appl. No. 10/771,076, May 10, 2007 (2 pgs).
USPTO Office Action for U.S. Appl. No. 10/771,076, Jan. 30, 2008 (11 pgs).
USPTO Office Action for U.S. Appl. No. 10/784,353, Jun. 30, 2005 (6 pgs).
USPTO Office Action for U.S. Appl. No. 10/784,353, Jan. 10, 2006 (11 pgs).
USPTO Office Action for U.S. Appl. No. 10/784,353, Apr. 19, 2006 (3 pgs).
USPTO Office Action for U.S. Appl. No. 10/784,353, Jan. 8, 2007 (12 pgs).
Internet Archive Wayback Machine: "TAB New Zealand's Betting Agency", <http://web.archive.org/web/20031004035004/http://tab.co.nz/>; Oct. 4, 2003 (1 pg.).
Intellectual Property Office of New Zealand Examination Report for Patent Application No. 549116, Jul. 31, 2008 (2 pgs.).
USPTO Office Action for U.S. Appl. No. 10/771,076, Sep. 3, 2008 (12 pgs).
USPTO Office Action for U.S. Appl. No. 10/784,353, Sep. 5, 2008 (8 pgs).
Wonderland Greyhound Park, "Wonderland Wagering Guide," retrieved from Internet (Aug. 29, 2008) dated Apr. 3, 2002 and Dec. 11, 2002, from Internet URL <http://web.archive.org/web/20021211160142/http://wonderlandgreyhound.com/wagering.html> (9 pgs).
USPTO Office Action for U.S. Appl. No. 10/784,353, Mar. 11, 2008 (10 pgs).
European Patent Office, Office Action for Application No. 05723963.4, May 2, 2008 (5 pgs).
European Patent Office, Office Action for Application No. 05712675.7 Feb. 21, 2008 (5 pgs).
Intellectual Property Office of New Zealand Examination Report for Patent Application No. 549121, Mar. 14, 2008 (2 pp.).
Intellectual Property Office of New Zealand Examination Report for Patent Application No. 549700, Mar. 14, 2008 (2 pp.).
"*NTRA All-Star Jockey Championship Special Wagers*"; 3 pages; date unknown.
"*Wagering Information; Straight or Basic Wagers*"; Lone Star Park at Grand Prairie: Player's Guide; http://www.lonestarpark.com/bet_info.asp; 3 pages; date unknown.
"*Wagering Information; Straight or Basic Wagers*"; NTRA.com; http://www.ntra.com/news.asp?type=playthehorses&id=4799; 3 pages; date unknown.
"*Glossary of Terms*"; NTRA.com; http://www.ntra.com/news.asp?type=playthehorses&id=4797; 3 pages; date unknown.
"*The Basics of Horseplay*"; NTRA.com; http://www.ntra.com/news.asp ?type=playthehorses&id-4795; 2 pages; date unknown.
*Webster's New Twentieth Century Dictionary of the English Language*; Unabridged; Second Edition; 2 pages; 1978.
New Zealand Patent Application No. 333267 entitled *Sporting Event Wagering System*; Abandoned by Applicant on Jun. 13, 2000; 2 pages; filed Dec. 9, 1998.
*Nags Head Software, Horserace*; 3 pages; circa Mar. 15, 2001.
*Bet with the People Who Know Racing*; Racing Daily Forum; 15 pages; Jul. 24, 2001.
*Betting Boolean-Style: A Framework for Trading in Securities Based on Logical Formulas*; Lance Fortnow, et al.; 12 pages; Jun. 2003.
*Quote of the Day; Bet of the Day*; London Times; 1 page; Jul. 30, 2003.
The Patent Office Search Report for International Application No. GB0320232.2; 6 pages; Dec. 17, 2003.
Examination Report for New Zealand Patent Application No. 530448; 1 page; Sep. 17, 2004.
Patent Pending U.S. Appl. No. 10/983,279 entitled *System and Method for Betting on a Subset of Participants in an Event* by Lee M. Amaitis, et al.; filed Nov. 5, 2004.
Patent Pending U.S. Appl. No. 11/076,561 entitled *System and Method for Betting on a Subset of Participants in an Event According to Multiple Groups* by Lee M. Amaitis, et al; filed Mar. 9, 2005.
Notification of Transmittal of the International Search Report or the Declaration for International Application No. PCT/US03/26235; 5 pages; Apr. 13, 2005.
Report of Interview from The Patent Office for Great Britain Application No. GB0320232.2; 3 pages; Sep. 28, 2005.
DICT.org; *The DICT Development Group; "To back the field"*; http://www.dict.org/bin/Dict?Form=Dict2&Database=*&Query=To+back+the=field; 6 pages; Nov. 24, 2005.
*Chilliman Chili Parlor—Appetizers; The Chili Parlor; Appetizers; A Day at the Races*; http://web.archive.org/web/20010305124432/http://chilliman.com/chiliparlor_appetizers.htm; 10 pages; Nov. 25, 2005.
*New Zealand Racing Board*; Opposition to New Zealand Patent Application No. 530448 in the Name of Cantor Index LLC; Statement of Case; 12 pages; Nov. 28, 2005.
United States Patent and Trademark Office: Office Action for U.S. Appl. No. 10/453,769, filed Jun. 3, 2003 in the name of Lee M. Amaitis, et al, 20 pages; Mar. 14, 2006.
Letters Patent for New Zealand Patent No. 530448; 1 page; Mar. 16, 2006.
Examination Report from The Patent Office for Great Britain Application No. GB0320232.2; 7 pages; May 11, 2006.
Examination Report for New Zealand Patent Application No. 539209; 2 pages; May 24, 2006.
Examination Report for New Zealand Patent Application No. 547179; 2 pages; May 24, 2006.
Office Action from the Patent Office for Great Britain Application No. GB0320232.2; 3 pages; Dec. 6, 2006.
United States Patent and Trademark Office: Office Action for U.S. Appl. No. 10/453,769, filed Jun. 3, 2003; in the name of Lee M. Amaitis, et al., 10 pages; Feb. 2, 2007.
United States Patent and Trademark Office: Office Action for U.S. Appl. No. 11/022,394, filed Dec. 22, 2004 in the name of Lee M. Amaitis, et al., 16 pages; Mar. 22, 2007.
European Search Report for Application No. 03816823.3-1238; 3 pages; Apr. 17, 2007.
Notification of Transmittal of the International Search Report and the Written Opinion of the International Searching Authority, or the Declaration for International Application No. PCT/US05/47027; 8 pages; Apr. 26, 2007.
United States Patent and Trademark Office, Office Action; for U.S. Appl. No. 10/453,769; 14 pages; Jul. 17, 2007.

United States Patent and Trademark Office; Notice of Allowance and Fee(s) Due for U.S. Appl. No. 11/022,394, filed Dec. 22, 2004 in the name of Lee M. Amaitis; 7 pages; Aug. 10, 2007.
Patent Pending U.S. Appl. No. 11/928,939 entitled *System and Method for Betting on a Subset of Participants in an Event* by Lee M. Amaitis, et al.; filed Oct. 30, 2007.
Patent Pending U.S. Appl. No. 11/928,649 entitled *System and Method for Betting on a Subset of Participants in an Event Wherein Betting Parameters May Change Over Time*; by Lee M. Amaitis, et al.; filed Oct. 30, 2007.
European Patent Office Examination Report for Application No. 03 816 823.3-1238; 4 pages; Nov. 19, 2007.
Anthony LeMaire; *Horse Racing Betting Odds*; http://ezinearticles.com;/?Horse-Racing-Betting-Odds&id =125666; 1 page; retrieved Jan. 4, 2008.
United States Patent and Trademark Office; Office Action for U.S. Appl. No. 10/453,769, filed Jun. 3, 2003 in the name of Lee M. Amaitis; 14 pages; Jan. 15, 2008.
Notification of Transmittal of the International Search Report and the Written Opinion of the International Searching Authority for International Application No. PCT/US06/08695; 9 pages; Mar. 24, 2008.
United States Patent and Trademark Office; Office Action for U.S. Appl. No. 11/076,561, filed Mar. 9, 2005 in the name of Lee M. Amaitis; 25 pages; Mar. 24, 2008.
United States Patent and Trademark Office; Office Action for U.S. Appl. No. 10/983,279, filed Nov. 5, 2004 in the name of Lee M. Amaitis; 17 pages; Jun. 13, 2008.
Intellectual Property Office of New Zealand; Examination Report for Application No. 539209; 4 pages; Jul. 31, 2008.
United States Patent and Trademark Office; Office Action for U.S. Appl. No. 10/453,769, filed Jun. 3, 2003 in the name of Lee M. Amaitis; 10 pages; Aug. 8, 2008.
United States Patent and Trademark Office; Office Action for U.S. Appl. No. 11/928,839, filed Oct. 30, 2007 in the name of Lee M. Amaitis; 7 pages; Aug. 11, 2008.
Intellectual Property Office of New Zealand; Examination Report for Patent Application No. 547179; 4 pages; Aug. 28, 2008.
Intellectual Property Office of New Zealand; Examination Report for Patent Application No. 539209; 1 page; Sep. 4, 2008.
Patent Pending U.S. Appl. No. 10/771,221, filed Feb. 3, 2004.
Patent Pending U.S. Appl. No. 10/771,076, filed Feb. 3, 2004.
Patent Pending U.S. Appl. No. 10/784,353, filed Feb. 23, 2004.
Patent Pending U.S. Appl. No. 10/453,769, filed Jun. 3, 2003.
Patent Pending U.S. Appl. No. 11/022,394, filed Dec. 22, 2004.
United States Patent and Trademark Office; Office Action for U.S. Appl. No. 10/983,279, 16 pages; Dec. 24, 2008.
United States Patent and Trademark Office; Office Action for U.S. Appl. No. 11/076,561; 11 pages; Dec. 22, 2008.
USPTO Office Action for U.S. Appl. No. 10/771,221, Nov. 12, 2008 (12 pgs).
Notice of Opposition for New Zealand Patent No. 549121; 5 pages; Dec. 23, 2008.
USPTO Office Action for U.S. Appl. No. 10/771,221, Sep. 9, 2005 (9 pgs).
USPTO Office Action for U.S. Appl. No. 10/771,221, Mar. 8, 2006 (12 pgs).
USPTO Office Action for U.S. Appl. No. 10/771,221, Dec. 27, 2006 (6 pgs).
USTPO Office Action for U.S. Appl. No. 10/771,221, Aug. 17, 2007 (7 pgs).
USPTO Office Action for U.S. Appl. No. 10/771,221, Nov. 1, 2007 (3 pgs).
USPTO Office Action for U.S. Appl. No. 10/771,221, Jan. 28, 2008 (8 pgs).
USPTO Office Action for U.S. Appl. No. 10/771,076, Jul. 14, 2005 (9 pgs).
USPTO Office Action for U.S. Appl. No. 10/771,076, Feb. 14, 2007 (11 pgs).
USPTO Office Action for U.S. Appl. No. 10/771,076, May 10, 2007 (2 pgs).
USPTO Office Action for U.S. Appl. No. 10/771,076, Jan. 30, 2008 (11 pgs).
USPTO Office Action for U.S. Appl. No. 10/771,076, Sep. 3, 2008 (12 pgs).
USPTO Office Action for U.S. Appl. No. 10/784,353, Jun. 30, 2005 (6 pgs).
USPTO Office Action for U.S. Appl. No. 10/784,353, Jan. 10, 2006 (11 pgs).
USPTO Office Action for U.S. Appl. No. 10/784,353, Apr. 19, 2006 (3 pgs).
USPTO Office Action for U.S. Appl. No. 10/784,353, Jan. 8, 2007 (12 pgs).
USPTO Office Action for U.S. Appl. No. 10/784,353, Jul. 11, 2007 (15 pgs).
USPTO Office Action for U.S. Appl. No. 10/784,353, Mar. 11, 2008 (10 pgs).
USPTO Office Action for U.S. Appl. No. 10/784,353, Sep. 5, 2008 (8 pgs).
Amended Notice of Opposition for NZ Patent Application No. 549121; 4 pages; Mar. 3, 2009.
"How to Play"; accessed Mar. 24, 2009 at http://web.archive.org/web/19980623064856/www.tab.co.nz/4_how_to_play/4_f_how_to.html.
"Thoroughbred Times", accessed Mar. 24, 2009 at http://www.thoroughbredtimes.com/national-news/2004/January/15/magna-institutes-pick-five-wager.aspx.
"Majorwager.com" accessed Mar. 24, 2009 at http://www.majorwager.com/forums/race-track/139617-magna-pick-5-fails-make-500k-pool.html.
Los Angeles Times, "Magna 5 might be the Ticket", accessed Mar. 24, 2009 at http://articles.latimes.com/2004/jan/31/sports/sp-insider31.
"Magna Pick 5 Handle Tops $600,000", by Blood Horse Staff; accessed Mar. 24, 2009 at http://www.bloodhorse.com/articleindex/article.asp?id=20819.
"Your Multi Tab" Brochure, accessed Mar. 24, 2009 at http:web.archive.org/web/20031219010102/www.tab.co.nz/Multi/tab-multi-brochure.pdf.
European Search Report for Application No. 05712661.7; 3 pages; Aug. 11, 2009.
U.S. PTO Office Action for U.S. Appl. No. 10/784,353; 13 pages; Jun. 3, 2009.
Invendium Ltd., Online Betting Guide (OLBG) Betting School, 2202-2009, retrieved from Internet www.online-betting-guide.co.uk on May 19, 2009 from URL<http://www.online-betting-guide.co.uk/school/horse_racing_bets.php>.
U.S. PTO Office Action for U.S. Appl. No. 10/453,769; 12 pages; Aug. 4, 2009.
Beyer, Andrew, The Winning Horseplayer, 1994, 138-139.
U.S. PTO Office Action for U.S. Appl. No. 10/983,279; 16 pages; Dec. 24, 2008.
U.S. PTO Office Action for U.S. Appl. No. 11/076,561; 11 pages; Dec. 22, 2008.
U.S. PTO Office Action for U.S. Appl. No. 11/928,839; 14 pages; Jun. 23, 2009.
Intellectual Property Office of New Zealand Examination Report for U.S. Appl. No. 565411, Oct. 23, 2009 (3 pgs.).
AU Examiners Report for AU Application No. 2006276086; 4 pages; Aug. 7, 2009.
U.S. PTO Office Action for U.S. Appl. No. 10/453,769; 3 pages; Dec. 6, 2009.
U.S. PTO Office Action for U.S. Appl. No. 11/076,561; 29 pages; Oct. 19, 2009.

*FIG. 2A*

20a — CUSTOMER

32a

| | RACE | BET TYPE | SELECTED PARTICIPANTS | BET AMOUNT | RESULT | JACKPOT BETS WON |
|---|---|---|---|---|---|---|
| 100a | 2 | EXACTA | 2, 5 | $20.00 | W | 10 |
| 100b | 5 | EXACTA | 3, 7 | $30.00 | W | 15 |
| 100c | 6 | EXACTA | 1, 8 | $2.00 | W | 1 |

*FIG. 2B*

20b — CUSTOMER

32b

| | RACE | BET TYPE | SELECTED PARTICIPANTS | BET AMOUNT | RESULT | JACKPOT BETS WON |
|---|---|---|---|---|---|---|
| 100a | 1 | EXACTA | 10, 12 | $4.00 | W | ~~2~~ |
| 100b | 5 | EXACTA | 3, 7 | $30.00 | W | ~~15~~ |
| 100c | 7 | EXACTA | 3, 9 | $22.00 | L | 0 |

*FIG. 2C*

20n — CUSTOMER

32n

| | RACE | BET TYPE | SELECTED PARTICIPANTS | BET AMOUNT | RESULT | JACKPOT BETS WON |
|---|---|---|---|---|---|---|
| 100a | 3 | EXACTA | 3, 10 | $50.00 | W | 25 |
| 100b | 5 | EXACTA | 3, 7 | $100.00 | W | 50 |
| 100c | 5 | EXACTA | 7, 3 | $100.00 | L | ~~50~~ |
| 100d | 7 | EXACTA | 2, 9 | $40.00 | W | 20 |

JACKPOT RACE EVENT

TECHNICAL FIELD OF THE INVENTION

This invention relates in general to systems that facilitate betting on events and, more particularly, to a system and method for conducting a jackpot race event.

BACKGROUND OF THE INVENTION

Wagering on sporting events, such as horse races, for example, is a large and growing industry in many parts of the world. Various types of betting products or systems are available for various types of sporting events For example, typical horse racing bets allow bettors to bet on the finishing position of a single horse or several horses in a particular race or series of races. For instance, a bettor can bet on a particular horse to finish first (win), finish in the top two (place), or finish in the top three (show). A bettor may also make various combination bets with multiple horses, such as an exacta bet (covering the top two finishing horses in order) or a trifecta bet (covering the top three finishing horses in order). In addition, a bettor may bet on a series of races, such as the daily double (winners of two consecutive races), the pick-three (winners of three consecutive races), and the pick-six (winners of six consecutive races), for example.

In a pari-mutuel betting system, all bets regarding a particular event are aggregated, a commission (or "take-out") is taken by the track, and the remainder is distributed among the winning bettors. For example, pari-mutuel betting systems are commonly used in North America (and other various places throughout the world) for betting on horse races.

SUMMARY OF THE INVENTION

According to one embodiment, a method for wagering on a jackpot race event comprises receiving a qualifying bet associated with a customer. The qualifying bet comprises a first bet component and a second bet component. The first bet component is associated with a first qualifying race event and comprises a first bet amount. The second bet component is associated with a second qualifying race event and comprises a second bet amount. If both the first bet component and the second bet components are winning bets, the method continues by allocating to the customer a particular number of jackpot bets for a jackpot race event. The particular number of jackpot bets is based at least in part upon the first bet amount and the second bet amount. The first bet amount is allocated to a common pari-mutuel pool for the first qualifying race event.

According to another embodiment, a system for wagering on a jackpot race event, comprises a memory and a processor. The memory stores a qualifying bet associated with a customer and comprising a first bet component and a second bet component. The first bet component is associated with a first qualifying race event and comprises a first bet amount. The second bet component is associated with a second qualifying race event and comprises a second bet amount. The processor identifies the outcome of the first and second bet components. If both the first bet component and the second bet components are winning bets, the processor allocates to the customer a particular number of jackpot bets for a jackpot race event. The particular number of jackpot bets is based at least in part upon the first bet amount and the second bet amount.

Various embodiments of the present invention may benefit from numerous advantages. It should be noted that one or more embodiments may benefit from some, none, or all of the advantages discussed below.

In prior systems, bets are received on individual races and the full payout for those races are given when the races are concluded. This can cause a peak in activity based around certain races. Such a spike in betting activity within a small period of time can cause an over consumption of network resources. By having a jackpot race at the end of the racing day, for example, where the bets placed on this race are is linked to the results of qualifying races which are spread throughout the day, bets placed by bettors on the qualifying races are also spaced throughout the day. Therefore the betting system will receive bets from bettors over a larger period of time throughout the course of the day. In this way, the load on the network resources is spread throughout the day. This technical advantage is applicable to the settling of the bets as well as the placing of bets on the races. For example, just as with placing and receiving bets under the present disclosure, the winning bets under the present disclosure may be determined and paid over a larger period of time. This also frees up network resources, increases speed and throughput efficiency.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIGS. 2A to 2C illustrate example jackpot qualifying bets used in the system of FIG. 1;

DETAILED DESCRIPTION OF EXAMPLE EMBODIMENTS OF THE INVENTION

Figure 1:
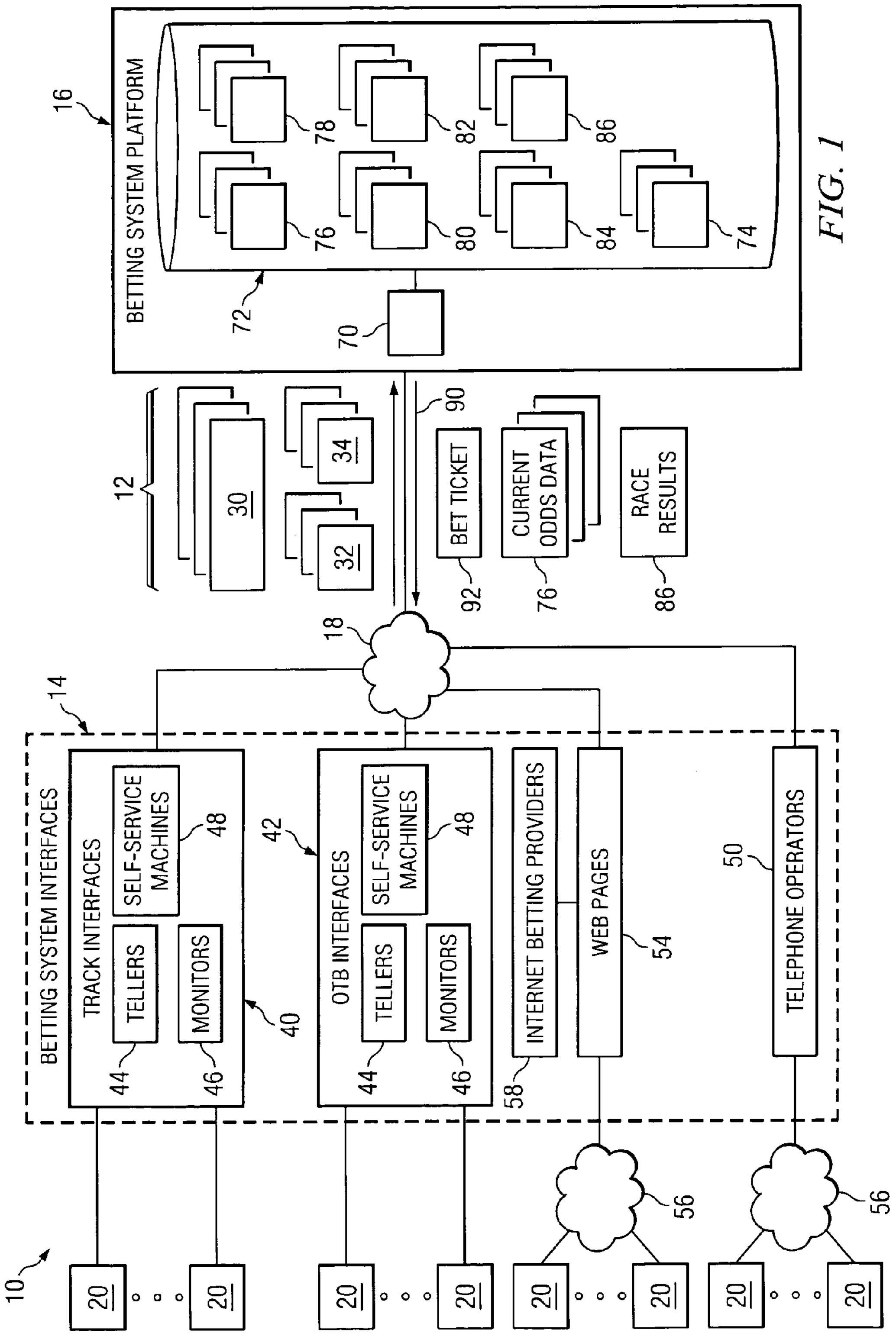
FIG. 1 illustrates an example system for providing and managing bets related to a jackpot race event in accordance with an embodiment of the present invention.

FIG. 1 illustrates an example system 10 for providing and managing jackpot bets and associated jackpot qualifying bets for race events in accordance with an embodiment of the present invention. System 10 includes one or more betting system interfaces 14 and a betting system platform 16 coupled by one or more communications networks 18. In general, one or more customers 20 may receive betting information (such as event times, betting rules, betting options and odds, for example) and/or place bets 12 via betting system interfaces 14. In some embodiments, bets 12 are received by betting system interfaces 14 and communicated to betting system platform 16. Betting system platform 16 may then store the received bets 12, determine appropriate odds, bet results and payouts, and communicates such odds, bet results and payouts to one or more of the betting system interfaces 14. Bets 12 may comprise traditional bets 30, jackpot qualifying bets 32, and/or jackpot bets 34, as described in greater detail below.

System 10 permits customers 20 to place bets 12 on a race event having a group of race participants, such as a horse race, dog race, or auto race, for example. For example, a race track may host a series of horse race events throughout the day. In addition to the traditional bets 30 that a customer 20 can make at the race track, a customer 20 can bet on a designated number (e.g., three) of selected race events to qualify for betting on a jackpot race event. Although the remainder of this description details examples using three selected race events, it should be understood that any suitable number of race events may be used. These preliminary race events are referred to as "qualifying" race events and the bet made on them referred to as a jackpot qualifying bet 32. Each jackpot qualifying bet 32 comprises one or more bet components 100 (illustrated in detail in FIGS. 2A-2C). In one embodiment, all of the jackpot qualifying bets 32 are generally made using a particular betting form (illustrated in detail in FIG. 3), and the customer 20 can select which race events to use as the qualifying race events. The types of bets made on these qualifying race events are generally exacta bets, but may be any kind of exotic bet, including trifecta bets, quinella bets, and superfecta bets, among others. Moreover, variations and/or combinations of these bets, such as "wheel bets" and/or "box bets," may also be made for a particular event in a jackpot qualifying bet 32. If the customer 20 wins at least one bet component 100 in each of the designated number of qualifying race events for a qualifying bet 32, then customer 20 earns a particular number of bets in the associated jackpot race event, such as a jackpot race event to be run at the end of the racing day, at the end of the racing week, at the end of the racing season, or at any other suitable time. The bets earned for the jackpot race event by a customer 20 are referred to as jackpot bets 34. In one embodiment, if a customer 20 fails to win a bet component 100 in even a single qualifying race event for the jackpot qualifying bet 32, then that customer 30 does not earn any jackpot bets 34 for the jackpot race event associated with that jackpot qualifying bet 32.

System 10 may also permit customers 20 to place traditional bets 30 in addition to bets 32 and 34. Traditional bets 30 may include bets such as win bets, place bets, show bets, exacta bets, trifecta bets, wheel bets, box bets, daily double bets, and pick-six bets, among others, for example. In some embodiments, a customer 20 may place one or more traditional bets 30 and one or more jackpot qualifying bets 32 for the same race event or group of race events.

Odds and/or payouts for bets 12 provided by system 10 may be determined in any suitable manner. For example, odds and/or payouts for some bets 12 provided by system 10 may be determined according to a pari-mutuel system in which the wager amounts for a group of bets 12 (such as a particular type of bet 12 or bets 12 regarding a particular race event, for example) are pooled, a commission (or "take-out") is taken by the track or other wagering provider, and the remainder is distributed among the winning bettors. Alternatively, odds and/or payouts for some bets 12 provided by system 10 may be determined according to some other system, such as a betting system in which customers 20 take positions against a bookmaker, for example. For some bets 12, predetermined or fixed odds may be determined and communicated to customers 20.

The bet amounts for the same types of traditional bets 30 and jackpot qualifying bets 32 may be allocated to a common pari-mutuel pool for any given race event once these bets are placed. Therefore, if the type of bets are exacta bets, then an exacta pool may be established using bet amounts from the traditional exacta bets 30 and the jackpot qualifying exacta bets 32. However, separate pari-mutuel pools may be established for traditional bets 30 and jackpot qualifying bets 32 for different types of bets (e.g., exacta, trifecta, superfecta, etc.) in each race event. By using a common pari-mutuel pool for common types of bets 30 and 32, system 10 can achieve greater liquidity in the wagering pools. For example, because the exacta bet is a very popular bet in horse-racing, the pari-mutuel pool for the exacta bet will have liquidity. By combining the amounts bet on an exacta type jackpot qualifying bet 32 with the existing exacta pool for a given race event, the race track does not need to be concerned about whether there is enough money in the pool to warrant offering the jackpot bets 34.

The payouts for these bets 12 may be determined in a pari-mutuel manner according to the size of the various pools, the odds of the participants selected for the bets 12, and the amount of the bets 12. The jackpot race event is associated with a jackpot race pool. For each winning jackpot qualifying bet 32, the customer 20 will receive a percentage of the posted payout (e.g., 75%) with the remaining percentage (e.g., 25%) being allocated to the jackpot race pool. In contrast, a customer 20 would receive the full payouts (less commission) associated with a traditional bet 30. In this regard, the customer 20 agrees to contribute a portion of a payout from a winning bet in a qualifying race event into a jackpot race pool in exchange for the opportunity to win one or more bets on the associated jackpot race event.

The number of jackpot bets 34 that the customer 20 earns for the jackpot race event can depend upon one or more factors, such as, for example, the amounts that were bet by the customer 20 in the qualifying race events of the associated jackpot qualifying bet 32 and/or the odds of the participants selected in the jackpot qualifying bet 32. For example, the more a customer 20 bets in the qualifying race events of a jackpot qualifying bet 32, the more jackpot bets 34 are earned for the jackpot race event. In one embodiment, for every $2 bet on a qualifying race event in a jackpot qualifying bet 32, the customer 20 may earn one $2 jackpot bet 34 in the jackpot race event. Any other suitable proportion of amounts bet on qualifying race events can be used to determine the number of jackpot bets 34 earned by a customer 20.

In another example, the higher the odds for the participants selected in the jackpot qualifying bet 32, the more jackpot bets 34 are earned by the customer 20 for the jackpot race event. In this regard, a customer 20 may be rewarded for betting on long shots in the jackpot qualifying bet 32. One way to account for the odds of participants when determining the number of jackpot bets 34 to award to customers 20 is to award one or more additional jackpot bets 34 to customers 20 when a particular winning payout on a jackpot qualifying bet 32 is greater than an average payout for that same type bet throughout the day. For example, if the payouts on exacta bets 30 were averaged throughout a racing day at a particular race-track, each customer 20 that won a component 100 in a jackpot qualifying exacta bet 32 that paid more than the day's average exacta payout would be rewarded with one or more additional jackpot bets 34. Therefore, if the average exacta payout at the race track on the day is $30.00, then a customer 20 that has: (1) a component 100 as a part of a winning jackpot qualifying exacta bet 32 having a payout of $14.00 on a $2.00 wager would receive one jackpot bet 34; (2) a component 100 as a part of a winning jackpot qualifying exacta bet 32 having a payout of $32.00 on a $2.00 wager would receive one jackpot bet 34 plus at least one additional jackpot bet 34; and (3) a component 100 as a part of a winning jackpot qualifying exacta bet 32 having a payout of $44.00 on a $2.00 wager would receive one jackpot bet 34 plus at least one additional jackpot bet 34.

Depending on the margin of difference by which a qualifying jackpot bet 32 exceeds the average payout for that type of bet, the customer 20 may receive still additional jackpot bets 34. Therefore, for the bet 32 above in which the payout was $32.00 on a $2.00 wager, the customer 20 may receive one additional jackpot bet 34, whereas for the bet 32 above in which the payout was $44.00 on a $2.00 wager, the customer 20 may receive two additional jackpot bets 34. Any suitable margins of difference and additional numbers of jackpot bets 34 for these margins of difference may be used in system 10.

In a variation of this embodiment, rather than comparing the payouts of winning bets 32 against the average payout for that same type bet, the payouts of winning bets 32 may be compared against a predetermined payout, a randomly determined payout, or a pseudo-randomly determined payout, as appropriate, for determining one or more additional jackpot bets 34 to award to a customer 20.

In still another example, a customer 20 may be rewarded for betting on long shots by comparing the odds of one or more participants in a winning jackpot qualifying bet 32 against a threshold set of odds. In particular, if the odds of a single participant in a component 100 of a winning jackpot qualifying bet 32 is greater than the threshold odds, then the customer 20 may be rewarded with one or more additional jackpot bets 34. The number of additional jackpot bets 34 awarded to the customer 20 may increase as the number of participants in the bet 32 having odds greater than the threshold odds increases beyond one. Therefore, if a component 100 of a winning jackpot qualifying bet 32 has multiple participants with odds greater than the threshold odds, then a larger number of jackpot bets 34 may be awarded than if only a single participant was selected with odds greater than the threshold odds. The threshold odds to be used in this comparison may be predetermined, determined after betting is concluded based on average odds for winning bets, randomly determined, or pseudo-randomly determined as appropriate.

Any suitable number and combination of the methods described herein for determining the number of jackpot bets 34 awarded to a customer can be used in system 10. Therefore, a formula may consider the amounts bet on components 100 of winning jackpot qualifying bets 32 and the odds of the participants for such winning jackpot qualifying bets 32 to determine the number of jackpot bets 34 to award to a customer 20. This formula may be weighted toward one characteristic or another, or it may be evenly balanced among all characteristics that are considered.

Betting system interfaces 14 may include any suitable interface between a customer 20 and betting system platform 16. For example, as shown in FIG. 1, betting system interfaces 14 may include physical interfaces, such as track interfaces 40 and/or off-track interfaces 42. Track interfaces 40 are generally located at a track, while off-track interfaces 42 are generally located at an off-track-betting (OTB) establishment, such as an OTB parlor. Track interfaces 40 and off-track interfaces 42 may include tellers 44, which may receive bets 12 from and distribute payouts to customers 20, and/or monitors 46, which may be viewed by customers 20 to monitor betting information such as the event time, the current odds, and the projected or actual payouts for various bets 12, for example. In some situations, such information may be updated substantially in real time or at preset intervals as new bets 12 are placed and/or as information regarding the event changes, for example. Monitors 46 may include, for example, tote-boards or closed-circuit televisions located at a track or OTB establishment.

Track interfaces 40 and/or off-track interfaces 42 may also include one or more self-service betting machines 48. In some embodiments, self-service betting machines 48 allow customers 20 to insert payment into the machine (such as cash or by using a voucher or a credit or debit card), place one or more traditional bets 30, jackpot qualifying bets 32, and/or jackpot bets 32, and receive a printout (such as a ticket, for example) indicating the bet or bets placed. Printouts for winning bets may be inserted into the self-service betting machine, such as to receive a payment voucher (which may be used to receive a payout from a teller 44) or to place additional bets 12. In other embodiments, self-service betting machines 48 allow customers 20 to use a credit or debit card to place bets 12. The credit or debit card may have an associated account, which may be a betting account provided and/or managed by a betting account provider. In some embodiments, after the race event is completed, a customer 20 may insert or swipe his or her credit or debit card in the self-service betting machines 48 in order to update the balance on the card. Self-service betting machines 48 may also allow the customer 20 to print out payment vouchers which may be presented to a teller 44 in order to receive payments.

As shown in FIG. 1, betting system interfaces 14 may also include various non-physical interfaces, such as one or more telephone operators 50 and one or more web pages 54. Customers 20 may access or communicate with such non-physical interfaces via one or more communications networks 56. Communications networks 56 may include one or more servers, routers, switches, repeaters, backbones, links and/or any other appropriate type of communication devices coupled by links such as wire line, optical, wireless, or other appropriate links. In general, communication network 56 may include any interconnection found on any communication network, such as a telephone network, a local area network (LAN), metropolitan area network (MAN), wide area network (WAN), the Internet, portions of the Internet, or any other data exchange system. To access betting system interface 14 using communication networks 56, customers 20 may use a computer, a personal digital assistant (PDA), a cell-phone, a remote paging device, an electronic mail communication device, a handheld betting device, or any other suitable mobile device. In certain embodiments, customers 20 may receive any suitable information, such as betting information, from betting system platform 16 via mobile devices using, for example, communication networks 56 and betting system interfaces 14.

Telephone operators 50 may communicate betting information (such as event times, betting rules, betting options and odds, for example) to, and take bets 12 from, customers 20. Similarly, web pages 54 may communicate betting information to customers 20 and allow customers 20 to place bets 12. One or more of such web pages 54 may be hosted by one or more servers associated with system 10, which server or servers may also host betting system platform 16 in some embodiments. In some embodiments, betting information available to customers 20 via web pages 54 may be updated substantially in real time or at preset intervals as new bets 12 are placed and/or as information regarding the event changes, for example.

In some embodiments, one or more web pages 54 may be provided by, or associated with, an Internet betting provider 58, for example. Internet betting provider 58 may provide Internet account wagering by providing online betting accounts to one or more customers 20. Using an online betting account, a customer 20 may interface with one or more web pages 54 associated with the Internet betting provider 58 in order to fund the account, view betting information regarding race events, and place bets 12. Such online betting accounts may include one or more various types of accounts, such as deposit accounts, credit accounts, stop-loss accounts, and hybrid accounts, for example.

Some or all of the betting system interfaces 14 of system 10 may be operable to offer or receive all types of bets 12. However, in some embodiments, one or more betting system interfaces 14 may only offer or receive either jackpot qualifying bets 32 and jackpot bets 34, or traditional bets 30. For example, in a particular embodiment, a set of web pages associated with betting system platform 16 may allow customers 20 to place all types of bets 12, while a particular self-service betting machine 48 may only allow customers 20 to place either jackpot qualifying bets 32 and jackpot bets 34, or traditional bets 30.

As discussed above, betting system platform 16 is operable to receive bets 12 from betting system interfaces 14, store the received bets 12, determine appropriate odds, bet results and payouts, and communicate such odds, bet results and/or payouts to one or more of the betting system interfaces 14, which may then display such odds, bet results and/or payouts to customers 20. As shown in FIG. 1, betting system platform 16 includes a processor 70 coupled to a memory 72. Processor 70 is generally operable to execute a betting system software application 74 or other computer instructions to determine current odds data 76, bet results 78, and payouts 80, which are discussed below in greater detail.

As discussed above, betting system platform 16 comprises processor 70 and memory 72. Processor 70 may comprise any suitable processor that executes betting system software application 74 or other computer instructions, such as a central processing unit (CPU) or other microprocessor, and may include any suitable number of processors working together. Memory 72 may comprise one or more memory devices suitable to facilitate execution of the computer instructions, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), or any other suitable volatile or non-volatile memory devices.

Memory 72 is generally operable to store various information that may be used by processor 70 in determining odds, bet results and/or payouts. For example, memory 72 may comprise any suitable number of databases, which may be co-located or physically and/or geographically distributed. In the example shown in FIG. 1, memory 72 may store any or all of the following: betting system software application 74, current odds data 76, bet results 78, payouts 80, race event parameters 82, bet parameters 84, and race results 86.

Current odds data 76 may include current or near-current data regarding, for example, (a) the wager amounts stored in pari-mutuel pools for various bets 12, (b) current odds data for various bets 12 (whether such bets 12 are pari-mutuel or fixed odds bets), and/or (c) potential payout data for various bets 12, such that customers 20 may determine the potential payouts for bets 12 based on the wager amounts of such bets 12. As discussed above, processor 70 is operable to execute betting system software application 74 to determine such current odds data 76. Processor 70 may determine such current odds data 76 based at least on data received from memory 72 and/or one or more betting system interfaces 14. In addition, processor 70 may update such current odds data 76 based on new information being received by betting system platform 16. In some embodiments, processor 70 may update current odds data 76 in real time, substantially in real time, or at preset intervals (such as every 30 seconds, for example).

As shown in FIG. 1, current odds data 76 may be communicated to one or more betting system interfaces 14 via communications network 18, as indicated by arrow 90. Current odds data 76 may then be made available to customers 20, such as via tote boards or monitors 46 located at a track or OTB establishment, for example, or in appropriate web page(s) 54 that may be accessed by customers 20, for example. In this manner, customers 20 may have access to real-time or substantially real-time current odds data 76 regarding various bets 12 or race events.

Bet results 78 may comprise various data regarding the results of various bets 12 (including traditional bets 30, jackpot qualifying bets 32, and/or jackpot bets 34), such as the identity of the customer 20 who placed the bet 12, the result of the bet, the determined payout 80 for the bet 12 and/or whether the payout 80 was distributed to the customer 20, for example. Possible results for a bet 12 may include, for example, "win," "lose," "push," or "no action." Processor 70 may determine such results for a bet 12 based on race event parameters 82 regarding one or more relevant race events, bet parameters 84 regarding the bet 12, and race results 86 regarding one or more relevant race events.

Processor 70 may determine payouts 80 for each winning bet 12 based on various data depending on whether the bet 12 is a pari-mutuel, fixed-odds, or other type of bet. Processor 70 may determine payouts 80 for winning pari-mutuel and fixed-odds bets 12 according to known methods for determining payouts for such types of bets. It should be understood that the payouts 80 determined by betting system platform 16 may comprise potential payouts and profits, which may be calculated and/or updated dynamically prior to the race, or actual payouts and profits, which may be calculated after betting on the race has been closed, or after the race has been run and/or declared "official." As described above, the jackpot race event is associated with a jackpot race pool. For each winning jackpot qualifying bet 32, the customer 20 will receive a percentage of the posted payout (e.g., 75%) with the remaining percentage (e.g., 25%) being allocated to the jackpot race pool. These allocations may be reflected in payouts 80 and/or bet parameters 84.

Race event parameters 82 may comprise various parameters of one or more race events, such as, for example, the type of race event, the time, date and location of the race event and/or the number (or in some cases, the name) of each of the participants in the race event.

Bet parameters 84 may comprise various parameters of one or more received bets 12, such as the identity of the customer 20 who placed the bet 12, the manner in which the bet 12 was placed (such as via telephone, the Internet, or in person at a track or OTB establishment, for example), the type of bet 12 (such as whether the bet 12 is a traditional bet 30, a jackpot qualifying bet 32, or a jackpot bet 34, for example), the commission rate on the bet 12, the qualifying race events and the particular participants for a jackpot qualifying bet 32, and/or the wager amount of the bet 12.

Race results 86 may comprise various data regarding the results of one or more race events. Race results 86 may also include the outcome of each jackpot qualifying bet 32 and the constituent qualifying race events. In this regard, certain race results may be personalized for each customer 20 in accordance with their particular jackpot qualifying bets 32.

As discussed above, one or more communications networks 18 couple and facilitate wireless or wireline communication between one or more betting system interfaces 14 and betting system platform 16. Each communication network 18 may include one or more servers, routers, switches, repeaters, backbones, links and/or any other appropriate type of communication devices coupled by links such as wire line, optical, wireless, or other appropriate links. In general, each communication network 18 may include any interconnection found on any communication network, such as a local area network (LAN), metropolitan area network (MAN), wide area network (WAN), the Internet, portions of the Internet, or any other data exchange system.

It should also be understood that one, some or all of the components of betting system platform 16 may be located together or may be physically or geographically distributed. In addition, one, some or all of the components of betting system platform 16, as well as any wager pools (such as pari-mutuel pools, for example) associated with jackpot qualifying bets 32 and/or jackpot bets 34, may be located at a track at which race events associated with such bets are hosted or at any other suitable location, such as at another track or OTB entity, for example. In some embodiments, for example, pari-mutuel pools for jackpot qualifying bets 32 and/or jackpot bets 34 are hosted by the track at which the race events covered by such bets are occurring. In other embodiments, pari-mutuel pools for particular jackpot qualifying bets 32 and/or jackpot bets 34 are hosted by a track or OTB entity separate from the track at which the race events covered by such bets are occurring.

The operation of jackpot qualifying bets 32 and jackpot bets 34 is explained in greater detail with reference to FIGS. 2A-2C. FIG. 2A illustrates an example jackpot qualifying bet 32*a* for a customer 20*a*. FIG. 2B illustrates an example jackpot qualifying bet 32*b* for a customer 20*b*. FIG. 2C illustrates an example jackpot qualifying bet 32*n* for a customer 20*n*. In this example, assume that each of customers 20*a*, 20*b*, and 20*n* are betting on one or more of a plurality of horse races held at a race track. Each of the customers 20 makes a jackpot qualifying bet 32 to earn jackpot bets 34 for a jackpot race event to be held at the end of the racing day.

Referring to FIG. 2A, an example jackpot qualifying bet 32*a* comprises a bet on three qualifying race events from among a plurality of race events at a particular race track. Customer 20*a* may select these particular qualifying race events or they may have been selected on behalf of customer 20 (e.g., randomly, pseudo-randomly, according to a pattern, according to past preferences, or otherwise), such as by betting system platform 16. The particular qualifying race events selected for jackpot qualifying bet 32*a* include Race 2, Race 5, and Race 6. In one embodiment, each of the qualifying race events are selected at the time the jackpot qualifying bet 32 is made. In another embodiment, a customer 20 may pay the bet amounts for all the bet components 100 for a jackpot qualifying bet 32 but the actual race events and/or participants may be selected at various times after the jackpot qualifying bet 32 is made. In this regard, the customer 20 can process additional handicapping information leading up to the post time of a particular race event prior to finalizing a particular bet component 100.

Jackpot qualifying bet 32*a* comprises a separate bet component 100 associated with each corresponding qualifying race event. For example, a bet component 100*a* is associated with Race 2; bet component 100*b* is associated with Race 5; and bet component 100*c* is associated with Race 6. For each bet component 100 of a jackpot qualifying bet 32, a bet type is determined. In this example, the bet on the jackpot race event for which the customer 20*a* is attempting to qualify comprises an exacta bet. As a result, each of the bet components 100*a-c* of the qualifying bet 32*a* also comprise exacta bets. In this regard, to win a particular bet component 100, the customer 20*a* must correctly select the first and second participants to finish the selected race event.

As illustrated in FIG. 2A, bet component 100*a* indicates that customer 20*a* bet $20.00 on participants 2 and 5 to finish first and second, respectively, in Race 2. Bet component 100*b* indicates that customer 20*a* bet $30.00 on participants 3 and 7 to finish first and second, respectively, in Race 5. Bet component 100*c* indicates that customer 20*a* bet $2.00 on participants 1 and 8 to finish first and second, respectively, in Race 6. According to the rules of the jackpot race events described herein, if customer 20*a* is correct on all three bet components 100*a-c* for jackpot qualifying bet 32*a*, then customer 20*a* wins a particular number of jackpot bets 34 for the associated jackpot race event. If a customer 20*a* loses even a single bet component 100 of qualifying bet 32, then customer 20*a* does not win any jackpot bets 34. Also according to the rules, customer 20*a* receives a percentage of the posted payout (e.g., 75%) for each particular qualifying race event that is won with the remaining percentage (e.g., 25%) being allocated to the jackpot race pool.

FIG. 2A also illustrates the results of the individual bet components 100*a-c* for qualifying bet 32*a*. In this example, customer 20*a* won each bet component 100*a-c* and therefore won a particular number of jackpot bets 34 for the jackpot race event. The particular number of jackpot bets 34 won by the customer 20*a* depended, in this example, upon the bet amounts for each bet component 100*a-c*. For example, because customer 20*a* won bet component 100*a* in which $20.00 was bet, customer 20*a* won ten $2 jackpot bets 34. Because customer 20*a* won bet component 100*b* in which $30.00 was bet, customer 20*a* won fifteen $2 jackpot bets 34. Because customer 20*a* won bet component 100*c* in which $2.00 was bet, customer 20*a* won one $2 jackpot bet 34. Therefore, the total number of jackpot bets 34 won by customer 20*a* in qualifying bet 32*a* is twenty-six. In other embodiments, the odds of the participants selected for each bet component 100*a-c* are taken into account to determine the number of jackpot bets 34 won by customer 20*a*. For example, customer 20*a* may have received a higher number of jackpot bets 34 by betting on participants with higher odds (e.g., long shots) than by betting on participants with lower odds (e.g., favorites). This may be determined, as described above, by comparing the payouts for the winning bets against the average payout throughout the day for the same type of bet. Or, it may be determined by comparing the odds of one or more participants against a threshold set of odds.

Referring to FIG. 2B, an example jackpot qualifying bet 32*b* comprises a bet on three qualifying race events from among a plurality of race events at the particular race track. The particular qualifying race events selected for jackpot qualifying bet 32*b* include Race 1, Race 5, and Race 7. Jackpot qualifying bet 32*b* comprises a bet component 100*a* associated with Race 1, bet component 100*b* associated with Race 5, and bet component 100*c* associated with Race 7. The bet type for each of these bet components 100*a-c* is an exacta bet. In this regard, to win a particular bet component 100, customer 20*b* must correctly select the first and second participants to finish the selected race event.

As illustrated in FIG. 2B, bet component 100*a* indicates that customer 20*b* bet $4.00 on participants 10 and 12 to finish first and second, respectively, in Race 1. Bet component 100*b* indicates that customer 20*b* bet $30.00 on participants 3 and 7 to finish first and second, respectively, in Race 5. Bet component 100*c* indicates that customer 20*b* bet $22.00 on participants 3 and 9 to finish first and second, respectively, in Race 7. If customer 20*b* is correct on all three bet components 100*a-c* for jackpot qualifying bet 32*b*, then customer 20*b* wins a particular number of jackpot bets 34 for the associated jackpot race event. If customer 20*b* loses even a single bet component 100*a-c* of qualifying bet 32*b*, then customer 20*b* does not win any jackpot bets 34. Additionally, customer 20*b* receives a percentage of the posted payout (e.g., 75%) for each particular qualifying race event that is won with the remaining percentage (e.g., 25%) being allocated to the jackpot race pool.

FIG. 2B also illustrates the results of the individual bet components 100*a-c* for qualifying bet 32*b*. In this example, customer 20*a* won bet components 100*a* and 100*b*, but lost bet component 100*c*. As a result, customer 20*b* did not win any jackpot bets 34 for the jackpot race event. In particular, because customer 20*a* won bet component 100*a* in which $4.00 was bet, customer 20*a* would have won two $2 jackpot bets 34. Moreover, because customer 20*b* won bet component 100*b* in which $30.00 was bet, customer 20*a* would have won fifteen $2 jackpot bets 34. However, because customer 20*b* lost bet component 100*c*, customer 20*b* did not win any jackpot bets 34. Even though customer 20*b* did not win any jackpot bets 34 from qualifying bet 32, customer 20*b* still contributed a portion of the posted payouts for bet components 100*a* and 100*b* which were won to the jackpot race pool.

Referring to FIG. 2C, an example jackpot qualifying bet 32*n* comprises a bet on three qualifying race events from among a plurality of race events at the particular race track. The particular qualifying race events selected for jackpot qualifying bet 32*n* include Race 3, Race 5, and Race 7. Jackpot qualifying bet 32*n* comprises a bet component 100*a* associated with Race 3; bet component 100*b* associated with Race 5, bet component 100*c* associated with Race 5, and bet component 100*d* associated with Race 7. The bet type for each of these bet components 100*a-d* is an exacta bet. In this regard, to win a particular bet component 100, customer 20*n* must correctly select the first and second participants to finish the selected race event.

As illustrated in FIG. 2C, bet component 100*a* indicates that customer 20*n* bet $50.00 on participants 3 and 10 to finish first and second, respectively, in Race 3. Bet component 100*b* indicates that customer 20*n* bet $100.00 on participants 3 and 7 to finish first and second, respectively, in Race 5. Bet component 100*c* indicates that customer 20*n* bet $100.00 on participants 7 and 3 to finish first and second, respectively, in Race 5. Thus, customer 20*n* has multiple bet components 100*b* and 100*c* associated with Race 5. In this case, for example, customer 20*n* made an "exacta box bet" on participants 3 and 7 in Race 5, resulting in bet components 100*b* and 100*c*. Bet component 100*d* indicates that customer 20*n* bet $40.00 on participants 2 and 9 to finish first and second, respectively, in Race 7. If one of bet components 100*b* or 100*c* on Race 5 is a winner, and each of bet components 100*a* and 100*d* on Races 3 and 7, respectively, is a winner, then customer 20*n* wins a particular number of jackpot bets 34 for the associated jackpot race event. If customer 20*n* loses even a single bet component 100*a* or 100*d* of qualifying bet 32*n*, or both of bet components 100*b* and 100*c*, then customer 20*n* does not win any jackpot bets 34. Additionally, customer 20*n* receives a percentage of the posted payout (e.g., 75%) for each particular qualifying race event that is won with the remaining percentage (e.g., 25%) being allocated to the jackpot race pool.

FIG. 2C also illustrates the results of the individual bet components 100*a-d* for qualifying bet 32*n*. In this example, customer 20*n* won a bet component 100 for each race event and therefore won a particular number of jackpot bets 34 for the jackpot race event. This is true despite the fact that bet component 100*c*, on Race 5, was a loser, because bet component 100*b*, also on Race 5, was a winner. The particular number of jackpot bets 34 won by the customer 20*n* depended, in this example, upon the bet amounts for each winning bet component 100*a-d*. For example, because customer 20*n* won bet component 100*a* in which $50.00 was bet, customer 20*n* won twenty-five $2 jackpot bets 34. Because customer 20*n* won bet component 100*b* in which $100.00 was bet, customer 20*n* won fifty $2 jackpot bets 34. Because customer 20*n* won bet component 100*d* in which $40.00 was bet, customer 20*n* won twenty $2 jackpot bet 34. Therefore, the total number of jackpot bets 34 won by customer 20*n* in qualifying bet 32*n* is ninety-five. In other embodiments, the odds of the participants selected for each bet component 100*a-d* are taken into account to determine the number of jackpot bets 34 won by customer 20*n*. For example, customer 20*n* may have received a higher number of jackpot bets 34 by betting on participants with higher odds (e.g., long shots) than by betting on participants with lower odds (e.g., favorites).

Customers 20*a* and 20*n*, among others, now have the opportunity to place a number of jackpot bets 34 on the outcome of the jackpot race event for which they qualified by winning qualifying jackpot bets 32*a* and 32*n*, respectively. In one embodiment, this jackpot race event is run at the end of the racing day at the race track. As described above, customer 20*a* won twenty-six $2 jackpot bets 34 for the jackpot race event and customer 20*n* won ninety-five $2 bets 34 for the jackpot race event. Customers 20 may place any number and combination of jackpot bets 34 up to the designated amount. Therefore, customer 20*a* may place twenty-six separate $2 bets 34, one $52 bet 34, or any number and combination in between. Similarly, customer 20*n* may place ninety-five separate $2 bets 34, one $190 bet 34, or any number and combination in between. Each of these bets 34 will comprise exacta bets according to the example outlined above. Therefore, to win a jackpot bet 34, a customer 20 must correctly select the first and second participants to finish the jackpot race event.

After all of the customers 20 who qualify for the jackpot race event have made their jackpot bets 34, the jackpot race event is run. If no one wins their jackpot bets 34 on the jackpot race event, then the jackpot race pool carries over to the next jackpot race event. If more than one customer 20 wins the jackpot bet 34 on the jackpot race event, then the jackpot race pool is divided among the winners equally. In this regard, the payout for the jackpot race event is not determined according a pari-mutuel basis. Thus, by agreeing to contribute a portion of a payout earned in a series of qualifying events to a jackpot race pool, a customer has the opportunity to win a number of jackpot bets 34 in a jackpot race event wherein the winnings may be substantial.

Figure 3:
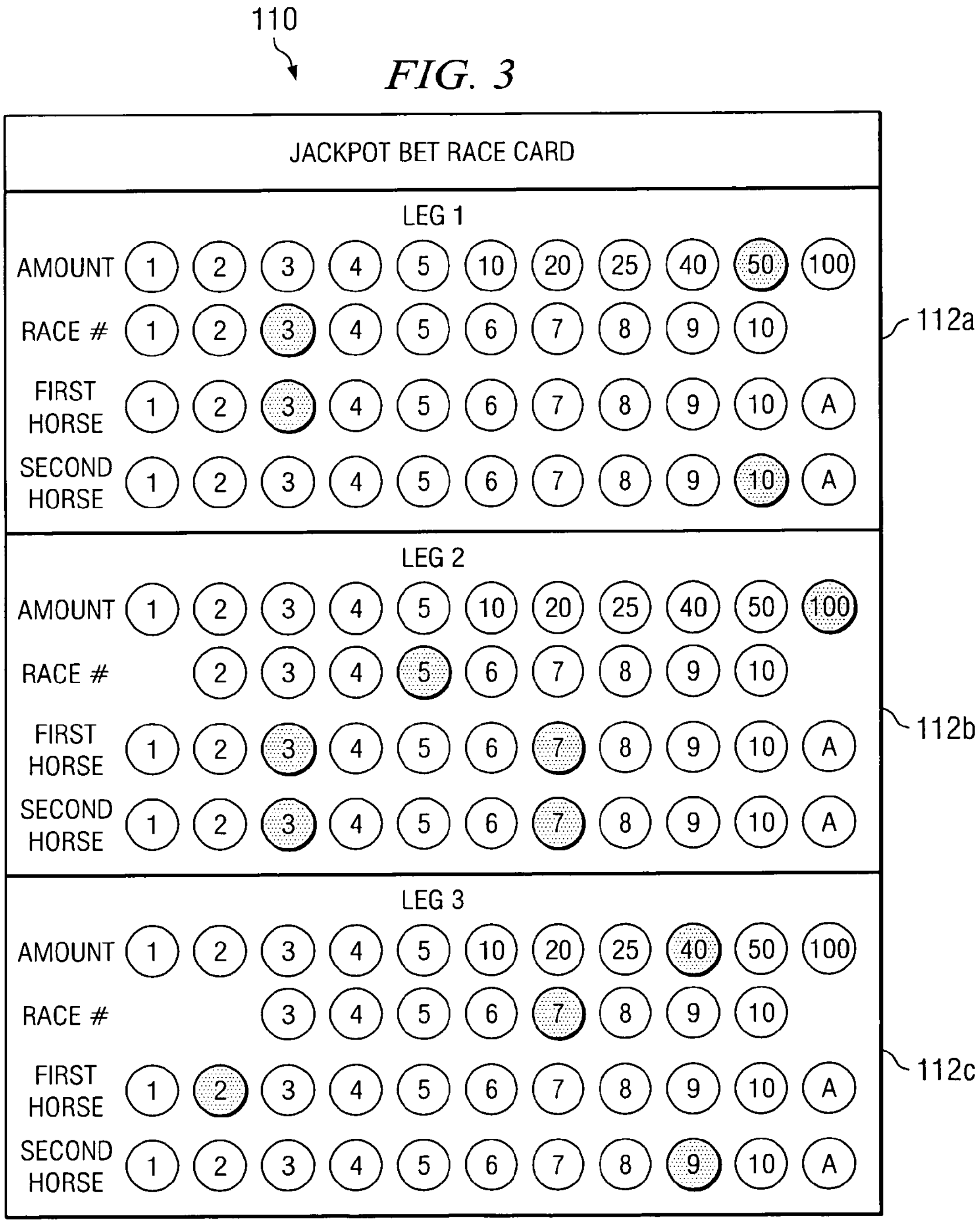
FIG. 3 illustrates an example betting form used in the system of FIG. 1.

FIG. 3 illustrates an example betting form 110 to place jackpot qualifying bets 32. Form 110 includes a section 112 corresponding to each leg of the qualification process. In particular, if the designated number of race events for a particular jackpot qualifying bet 32 is three, then a first section 112*a* corresponds to the first leg, a second section 112*b* corresponds to the second leg, and a third section 112*c* corresponds to the third leg. Within each betting section 112, a customer 20 has the opportunity to select a race event, a bet amount in any suitable denomination, and the participants for the bet. For any given leg of a jackpot qualifying bet 32, a customer 20 can place multiple bets, such as box bets and wheel bets. For example, an exacta box bet is made by selecting two participants as the first finisher and the same two participants as the second finisher. A box bet results in two bet components 100 for that particular race event. A wheel bet is made by selecting "A" as either the first finisher or the second finisher, combined with a particular participant for the other finisher. A wheel bet results in multiple bet components 100 for that particular race event based on the appropriate number of combinations associated with the wheel bet.

The particular betting form 110 illustrated in FIG. 3 corresponds to the jackpot qualifying bet 32*n* placed by customer

20*n*, as illustrated in FIG. 2C. For example, section 112*a* indicates how customer 20*n* placed a $50 exacta bet on horses 3 and 10 in Race 3. Section 112*b* indicates how customer 20*n* placed a $100 exacta box bet on horses 3 and 7 in Race 5 such that bet component 100*b* covered a $100 exacta bet on horses 3 and 7 to finish first and second in Race 5, and bet component 100*c* covered a $100 exacta bet on horses 7 and 3 to finish first and second in Race 5. Section 112*c* indicates how customer 20*n* placed a $40 exacta bet on horses 2 and 9 in Race 7.

Betting form 110 illustrated in FIG. 3 is merely an example and it should be understood that any other suitable betting form 110 may be used in system 10 for placing jackpot qualifying bets 32.

Figure 4:
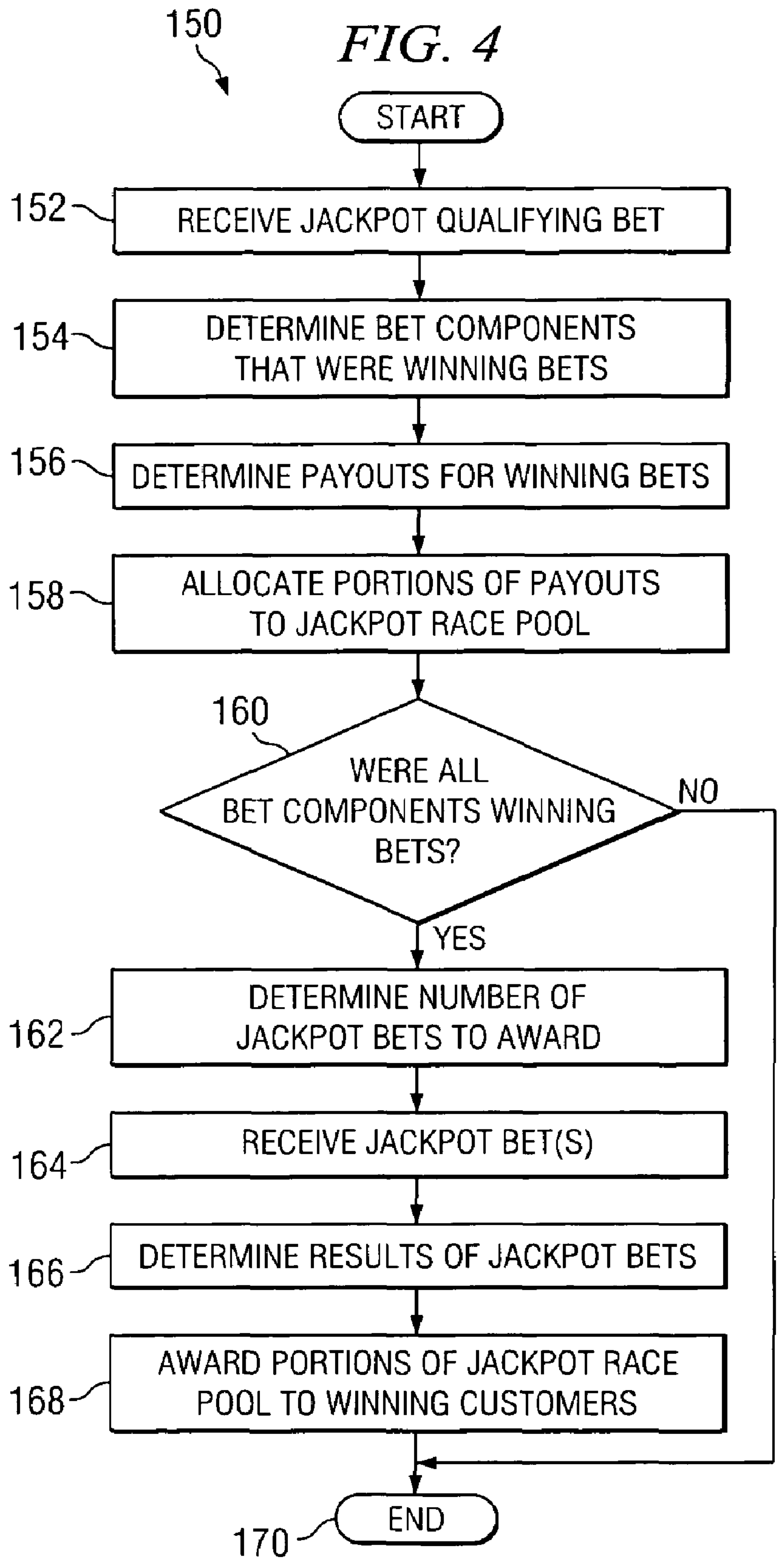
FIG. 4 is a flowchart illustrating an example method of receiving and managing bets related to jackpot race events in accordance with an embodiment of the present invention.

FIG. 4 is a flowchart 150 illustrating an example method of receiving and managing bets related to jackpot race events in accordance with an embodiment of the present invention. The method begins at step 152 where platform 16 receives a jackpot qualifying bet 32 comprising a plurality of bet components 100. Each bet component 100 is associated with a corresponding qualifying race event. At step 154, platform 16 determines the bet components 100 that were winning bets. For example, if the type of bet associated with the jackpot qualifying bet 32 was an exacta bet, then platform 16 determines which of the exacta bets on the qualifying race events were winning bets. For each of the winning bets, platform 16 determines payouts at step 156. A portion of each payout from a winning bet is allocated to the jackpot race pool of the appropriate jackpot race event at step 158.

Execution proceeds to step 160 where platform 16 determines whether all of the bet components 100 of the jackpot qualifying bet 32 received at step 152 were winning bets. If not all of the bet components 100 were winning bets based upon the outcomes of the qualifying race events, then the jackpot qualifying bet 32 is deemed a losing bet and execution terminates at step 170. If all of the bet components 100 were winning bets, as determined at step 160, then the jackpot qualifying bet 32 is deemed a winning bet and execution proceeds to step 162 where platform 16 determines the number of jackpot bets 34 to award to the customer 20 holding the winning jackpot qualifying bet 32. As described above, the number of jackpot bets 34 awarded to the customer 20 may be based upon the bet amounts associated with the bet components 100 of the jackpot qualifying bet 32, the odds of the participants selected for the bet components 100, or any other suitable factor associated with the bet 32 or the qualifying race events.

At step 164, platform 16 receives the jackpot bets 34 from the customers 20 holding winning jackpot qualifying bets 32. After the jackpot race event is run, platform 16 determines the results of the jackpot bets 34 to determine the winners and losers, at step 166. At step 168, platform 16 awards portions of the jackpot race pool to the customers 20 holding winning jackpot bets 34. The method terminates at step 170.

In a particular variation to the embodiments described above, one or more jackpot bets 34 may be awarded to a customer 20 that wins some but not all of the components 100 of a particular jackpot qualifying bet 32. For example, a number of jackpot bets 34 may be awarded to a customer 20 that wins 3 out of 4 components 100 (or any other suitable number of winning components 100 out of attempted components 100) of a jackpot qualifying bet 32. In this example, the higher the percentage of winning components 100, the higher the number of jackpot bets 34 that may be awarded to a customer 20. Therefore, a customer 20 that wins 3 out of 3 components 100 in a jackpot qualifying bet 32 may win more jackpot bets 34 than a customer 20 that wins 3 out of 4 components 100 in a jackpot qualifying bet 32. In this regard, a customer 20 that loses the first of a series of components 100 in a jackpot qualifying bet 32 can still win one or more jackpot bets 34. This creates a more sustained interest in the races throughout the day.

Although embodiments of the invention and their advantages are described in detail, a person skilled in the art could make various alterations, additions, and omissions without departing from the spirit and scope of the present invention as defined by the appended claims.

What is claimed is:

1. A method for wagering on a jackpot event, comprising the steps of:

receiving at a computer of a computerized betting system a qualifying bet associated with a customer;

if at least part of the qualifying bet is a winning bet, computing an allocation of a portion of a payout associated with the at least part of the qualifying bet to a jackpot pool, wherein the jackpot pool is associated with a first jackpot event;

if the qualifying bet is a winning bet, computing an allocation to the customer of at least one jackpot bet for the jackpot event;

receiving at the computerized betting system the jackpot bet from the customer;

if the jackpot bet is a winning bet, computing an allocation of a portion of the jackpot pool to the customer; and computing an allocation of the jackpot pool to a second jackpot event if there are no winning customers for the first jackpot event.

2. A system for wagering on a jackpot event, the system comprising:

a processor operable to:

identify a outcome of a qualifying bet;

if at least part of the qualifying bet is a winning bet, allocate a portion of a payout associated with the at least part of the qualifying bet to a jackpot pool, wherein the jackpot pool is associated with a first jackpot event;

receive an indication of a jackpot bet;

if the jackpot bet is a winning bet, allocate a portion of the jackpot pool to a customer associated with the jackpot bet; and allocate the jackpot pool to a second jackpot event if there are no winning customers for the first jackpot event.

3. A method of wagering on a jackpot event, the method comprising the steps of:

placing a wager on at least one event into a computerized betting system, wherein placing the wager includes agreeing that the computerized betting system is to process the wager:

if at least part of a qualifying wager includes a winning wager, that a portion of a payout associated with the qualifying wager will be allocated to a jackpot pool, wherein the jackpot pool is associated with a first jackpot event and the jackpot pool is allocated to a second jackpot event only if there are no winning customers for the first jackpot event; and if the wager is a winning wager, that at least one jackpot wager associated with a jackpot event will be allocated to a customer associated with the wager.

4. A method for wagering on a jackpot event, comprising the steps of:

receiving at a computer of a computerized betting system a qualifying bet associated with a customer, wherein the qualifying bet includes a first bet component and a second bet component, wherein the first bet component is associated with a first qualifying race event and comprises a first bet amount, and wherein the second bet component is associated with a second qualifying race event and comprises a second bet amount;

if at least part of the qualifying bet is a winning bet, computing an allocation of a portion of a payout associated with the at least part of the qualifying bet to a jackpot pool, wherein a part of the qualifying bet is a winning bet if at least one of the first bet component and the second bet component is a winning bet;

if the qualifying bet is a winning bet, computing an allocation to the customer at least one jackpot bet for the jackpot event, wherein the qualifying bet is a winning bet if both the first bet component and the second bet component are winning bets;

receiving at the betting system the jackpot bet from the customer; and if the jackpot bet is a winning bet, computing an allocation of a portion of the jackpot pool to the customer.

5. The method of claim 4, further comprising:

if the first bet component is a winning bet, computing a first payout for the first bet component; and if the second bet component is a winning bet, computing a second payout for the second bet component, wherein if at least one of the first bet component and the second bet component is a winning bet, allocating the portion of the payout includes allocating a portion of at least one of the first payout the second payout to the jackpot pool.

6. The method of claim 4, wherein the first bet component and the second bet component each comprise one of the following types of bets: an exacta bet; a trifecta bet; a quinella bet; and a superfecta bet.

7. The method of claim 4, wherein each bet component comprises a selection of at least two participants in a particular qualifying race event.

8. The method of claim 4, wherein the qualifying race events are selected from the following types of race events: a horse race; a dog race; and an auto race.

9. The method of claim 4, wherein the qualifying bet further comprises a third bet component associated with a third qualifying race event, the third bet component associated with the customer and comprising a third bet amount.

10. The method of claim 4, wherein the qualifying bet further comprises a third bet component associated with the first qualifying race event, the third bet component associated with the customer and comprising a third bet amount.

11. The method of claim 4, wherein each of the first and second bet components are received in a single transaction.

12. The method of claim 4, wherein the first qualifying race event and the second qualifying race event are selected by the customer from a series of qualifying race events that occur prior to the jackpot event.

13. The method of claim 4, further comprising the step of:

computing a substantially equal division of at least a portion of the jackpot pool among winning customers for the jackpot event.

14. The method of claim 4, wherein the portion of the payout is between 10% and 50%.

15. The method of claim 4, wherein:

each bet component comprises a selection of at least two participants in a particular qualifying race event, each participant associated with odds to win the particular qualifying race event; and a number of jackpot bets allocated to the customer is based at least in part upon the odds of at least some of the selected participants.

16. A system for wagering on a jackpot event, the system comprising:

a processor operable to:

identify a outcome of a qualifying bet, wherein the qualifying bet includes a first bet component and a second bet component, wherein the first bet component is associated with a first qualifying race event and comprises a first bet amount, wherein the second bet component is associated with a second qualifying race event and comprises a second bet amount, and wherein the qualifying bet is a winning bet if both the first bet component and the second bet component are winning bets;

if at least part of the qualifying bet is a winning bet, allocate a portion of a payout associated with the at least part of the qualifying bet to a jackpot pool;

receive an indication of a jackpot bet, wherein a part of the qualifying bet is a winning bet if at least one of the first bet component and the second bet component is a winning bet; and if the jackpot bet is a winning bet, allocate a portion of the jackpot pool to a customer associated with the jackpot bet.

17. The system of claim 16, wherein the processor is further operable to:

if the first bet component is a winning bet, determine a first payout for the first bet component;

if the second bet component is a winning bet, determine a second payout for the second bet component, wherein if at least one of the first bet component and the second bet component is a winning bet, allocating the portion of the payout includes allocating a portion of at least one of the first payout and the second payout to the jackpot pool.

18. The system of claim 16, wherein the first bet component and the second bet component each comprise one of the following types of bets: an exacta bet; a trifecta bet; a quinella bet; and a superfecta bet.

19. The system of claim 16, wherein each bet component comprises a selection of at least two participants in a particular qualifying race event.

20. The system of claim 16, wherein the qualifying race events are selected from the following types of race events: a horse race; a dog race; and an auto race.

21. The system of claim 16, wherein the qualifying bet further comprises a third bet component associated with a third qualifying race event, the third bet component associated with the customer and comprising a third bet amount.

22. The system of claim 16, wherein the qualifying bet further comprises a third bet component associated with the first qualifying race event, the third bet component associated with the customer and comprising a third bet amount.

23. The system of claim 16, wherein each of the first and second bet components are received in a single transaction.

24. The system of claim 16, wherein the first qualifying race event and the second qualifying race event are selected by the customer from a series of qualifying race events that occur prior to the jackpot event.

25. The system of claim 16, wherein the processor is further operable to divide substantially equally at least a portion of the jackpot pool among winning customers for the jackpot event.

26. The system of claim 16, wherein the portion of the payout is between 10% and 50%.

27. The system of claim 16, wherein: each bet component comprises a selection of at least two participants in a particular qualifying race event, each participant associated with odds to win the particular qualifying race event; and wherein the processor is operable to allocate a particular number of jackpot bets based at least in part upon the odds of at least some of the selected participants.

28. The system of claim 16, wherein the qualifying bet is associated with the customer, and the processor is further operable to:

if the qualifying event is a winning bet, allocate to the customer at least one jackpot bet for the jackpot event.

29. A method of wagering on a jackpot event, the method comprising the steps of:

placing a wager on at least one event through a computer of a computerized betting system, wherein the wager comprises a first bet component and a second bet component, wherein the first bet component is associated with a first qualifying race event and comprises a first bet amount, wherein the second bet component is associated with a second qualifying race event and comprises a second bet amount, and wherein placing the wager includes agreeing that the computerized betting system will process the wager by:

if at least part of a qualifying wager includes a winning wager, that a portion of a payout associated with the qualifying wager will be allocated to a jackpot pool; and if the wager is a winning wager, that at least one jackpot wager associated with a jackpot event will be allocated to a customer associated with the wager.

30. The method of claim 29, wherein:

the first bet component is associated with a first payout, a portion of which will be allocated to the jackpot pool associated with the jackpot event; and the second bet component is associated with a second payout, a portion of which will be allocated to the jackpot pool associated with the jackpot event.

31. The method of claim 29, wherein:

the first bet component and the second bet component each comprise one of the following types of bets: an exacta bet; a trifecta bet; a quinella bet; and a superfecta bet.

32. The method of claim 29, wherein:

each bet component comprises a selection of at least two participants in a particular qualifying race event.

33. The method of claim 29, wherein:

the qualifying race events are selected from the following types of race events: a horse race; a dog race; and an auto race.

34. The method of claim 29, wherein:

the qualifying bet further comprises a third bet component associated with a third qualifying race event.

35. The method of claim 29, wherein:

the qualifying bet further comprises a third bet component associated with the first qualifying race event, the third bet component associated with the customer and comprising a third bet amount.

36. The method of claim 29, wherein:

each of the first and second bet components are placed in a single transaction.

37. The method of claim 29, wherein:

the first qualifying race event and the second qualifying race event are selected from a series of qualifying race events that occur prior to the jackpot event.

38. The method of claim 29, wherein:

placing the bet includes agreeing that at least a portion of the jackpot pool will be divided among winning customers for the jackpot event.

39. The method of claim 29, wherein the portion of the payout is between 10% and 50%.

40. The method of claim 29, wherein:

each bet component comprises a selection of at least two participants in a particular qualifying race event, each participant associated with odds to win the particular qualifying race event; and a number of jackpot bets is based at least in part upon the odds of at least some of the selected participants.

41. The method of claim 29, wherein:

a number of jackpot bets allocated is determined based at least in part upon whether the first bet component and the second bet component are winning bets and further upon the first bet amount and the second bet amount.

42. A method of wagering on a jackpot event, the method comprising the steps of:

placing a wager on at least one event, wherein placing the wager includes placing the wager on a computerized betting system through a computer interface, and wherein placing the wager includes agreeing that:

if at least part of a qualifying wager includes a winning wager, that a portion of a payout associated with the qualifying wager will be allocated to a jackpot pool; and if the wager is a winning wager, that at least one jackpot wager associated with a jackpot event will be allocated to a customer associated with the wager.

* * * * *